Figure 1:
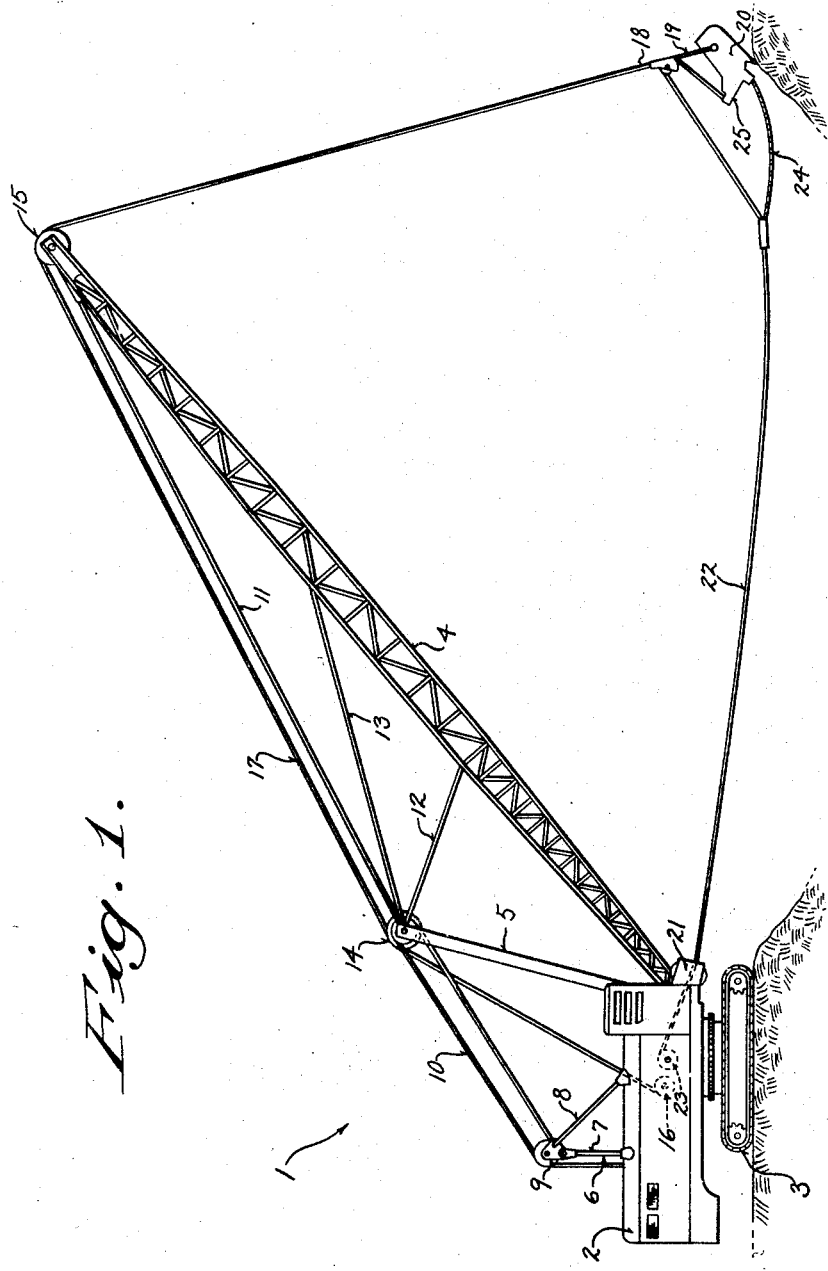

July 23, 1957 K. SCHNEIDER 2,800,205
BRAKE RELEASE

Filed June 1, 1954. 3 Sheets-Sheet 1

INVENTOR
Karl Schneider

BY Arthur H. Seidel
ATTORNEY

July 23, 1957  K. SCHNEIDER  2,800,205
BRAKE RELEASE
Filed June 1, 1954  3 Sheets-Sheet 2

INVENTOR
Karl Schneider
BY
Arthur H. Seidel
ATTORNEY

July 23, 1957 K. SCHNEIDER 2,800,205
BRAKE RELEASE
Filed June 1, 1954 3 Sheets-Sheet 3

INVENTOR
Karl Schneider
BY
Arthur H. Seidel
ATTORNEY

United States Patent Office 2,800,205
Patented July 23, 1957

2,800,205

BRAKE RELEASE

Karl Schneider, Greenfield, Wis., assignor to Harnischfeger Corporation, Milwaukee, Wis., a corporation of Wisconsin Application June 1, 1954, Serial No. 433,666

11 Claims. (Cl. 188—216)

This invention relates to friction brakes as may be employed in conjunction with the hoist and dragline cable spools of a dragline excavator, and it more specifically resides in a brake having a brake drum with a brake band in facing relation to the drum that is adapted to be wrapped tightly about the drum in a brake set position and to be radially shifted away from the drum into a brake released position, there being provided brake releasing means attached to the band for drawing the band from the drum and supporting the same in a position free of contact with the drum, which releasing means exerts a force upon the band to urge it away from the drum only upon placing the brake in released position.

To actuate a brake band disposed about a circumferential portion of a brake drum it is usual to cause a circumferential shift of one end of the band relative to the opposite end. By relatively drawing the ends toward one another the band diameter is reduced, with a wrapping of the band tightly against the drum being accomplished to effect braking action. A relative shift of the ends from one another increases band diameter and releases the band from engagement with the drum. This movement permits radial spacing of the band from the drum, and for a satisfactory brake release the band should stand back from the drum along its entire circumference. For lightweight bands of thin cross section a resilient material may be employed that tends to spring radially outwardly with sufficient force to sustain its own weight. For brake released position such a band will stand clear of frictional engagement with the drum. In the adaptation of the band type brake to larger brake sizes the shear weight of the band may, however, cause it to sag and brush against the drum when in brake released position.

For the larger brake sizes resort may be made to the use of a brake shoe arrangement, thus eliminating a band that would, by reason of its own weight, collapse against the drum when moved to released position. Such resort, however, introduces problems unique to the brake shoe construction, such as difficulty in attaining uniform gripping and difficulty in timing the braking and releasing motion of the individual shoes for attaining simultaneous action. Special constructions have been employed to support brake bands in spaced relation to the drum when released. Bias springs acting to draw the band radially from the drum, thus compensating for band weight, are one form of such construction. In this construction, however, a positive bias force is applied to the band at all times which is in opposition to a movement of the band into the braking position. An oversize actuator for shifting the band to braking position is now required and inertia factors are introduced that may cause brake action to become unduly sluggish.

The present invention provides a support for the band that applies a force for drawing the band from the drum only when the brake is released. The supporting force is not present during application of braking action, but instead is applied only when required. This permits the use of the brake band construction where larger braking capacity is necessary without impairment of the rapidity of brake response.

It is an object of this invention to provide for the support of a brake band in spaced relation to a brake drum upon disposing the brake in released position to prohibit frictional drag of the band against the drum.

It is another object of this invitation to provide brake releasing actuators in a brake for applying a force to the brake band that is present only during periods of brake release.

It is another object of this invention to provide a brake employing a brake band in conjunction with a brake drum in which the size of the band members may be increased, to handle increased loads, without an accompanying collapse of such a band of greater weight against the drum when the brake is placed in released position.

It is another object of this invention to provide a brake having a drum and encircling band in which releasing actuators for the band are employed to present a positive quick brake release with a rapid response to the actuation thereof.

It is another object of this invention to provide in a brake having a drum and band, in facing relation to the drum, for uniform spacing between the band and drum along the length of the band, upon placing the brake in released position.

These and other objects and advantages of this invention will appear in the description to follow. In the description reference is made to the accompanying drawings, in which there is shown by way of illustration and not of limitation, specific forms in which this invention may be embodied.

Figure 2:
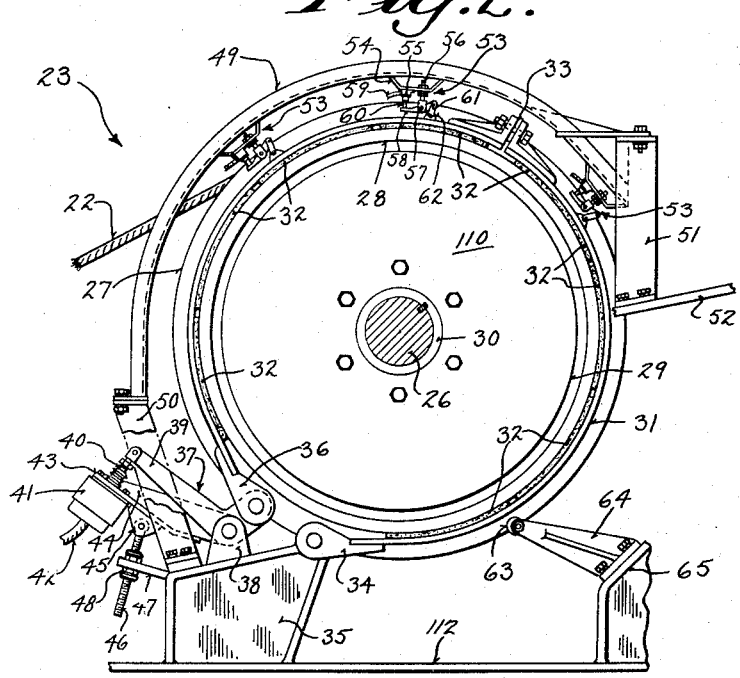
Figure 3:
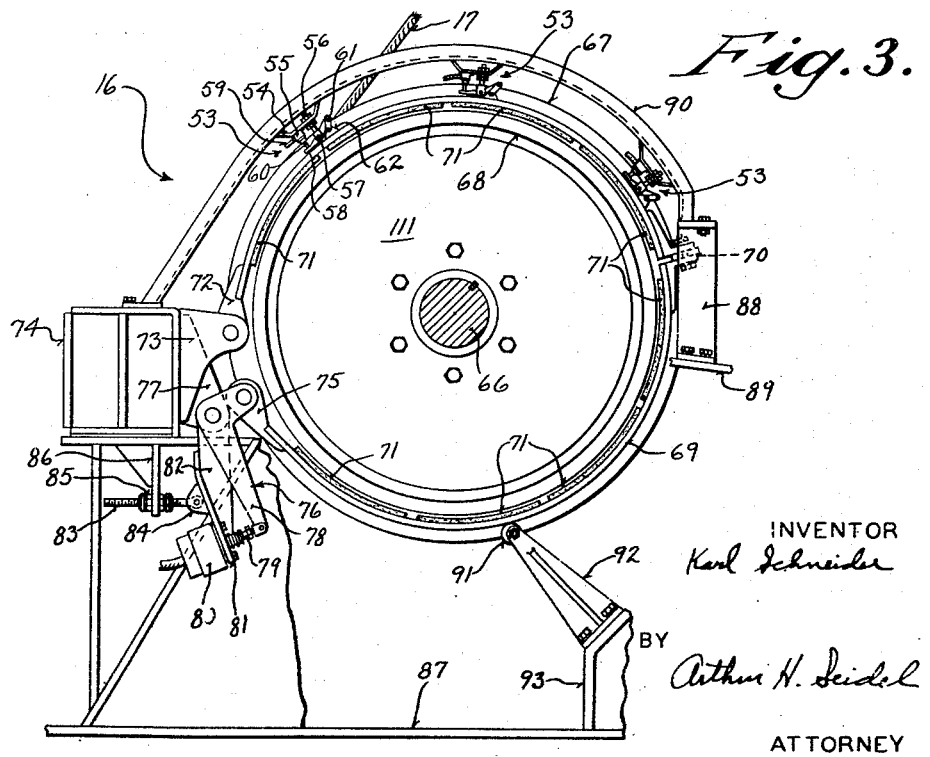
Figure 4:
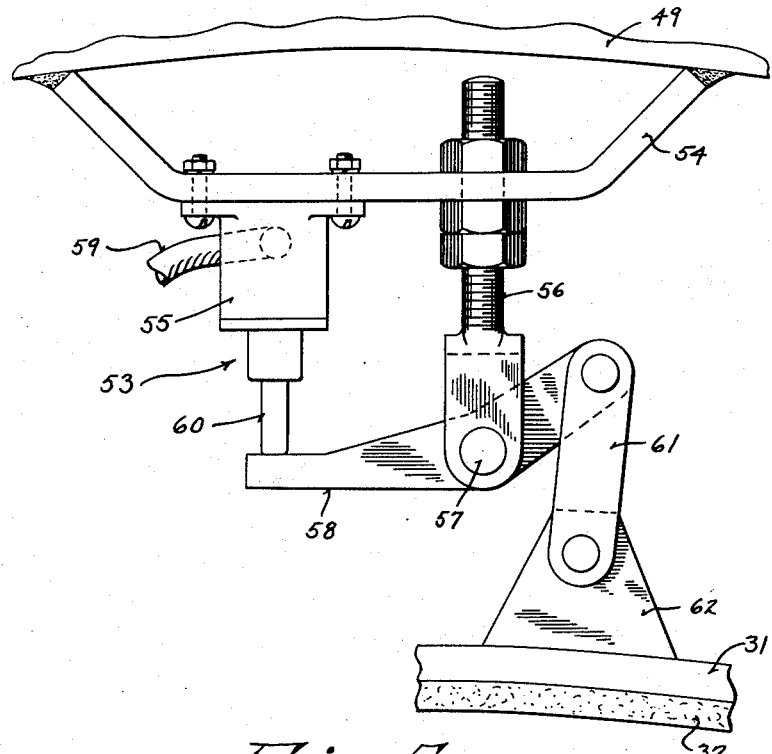
Figure 5:
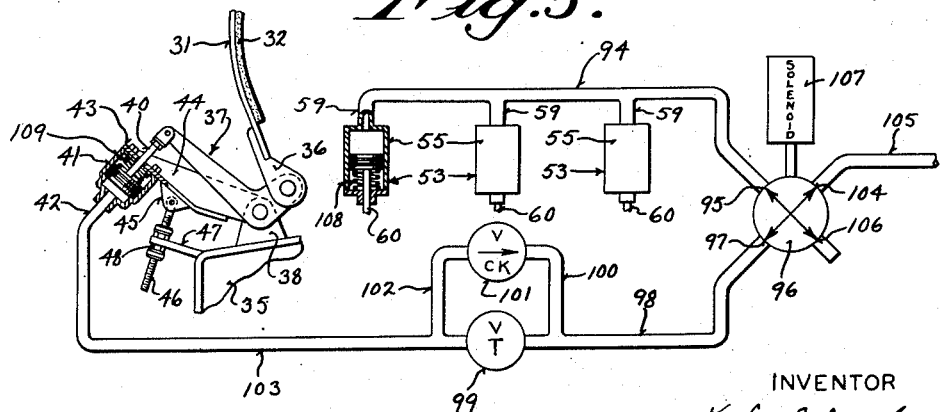

In the drawings:

Fig. 1 is a right hand side view in elevation of a dragline excavator in which this invention is embodied, Fig. 2 is a left hand side view in elevation of the dragline cable spool of the dragline excavator in Fig. 1 showing the holding brake employed in connection with such spool, Fig. 3 is a right hand side view in elevation of the hoist cable spool of the dragline excavator in Fig. 1 showing the holding brake employed in connection with such spool, Fig. 4 is a fragmentary side view in elevation showing a brake band release support as employed in the brakes shown in Figs. 2 and 3, and Fig. 5 is a schematic diagram of a pneumatic control system for the actuation of the brake shown in Fig. 2.

Referring now to the drawings, there is shown in Fig. 1 a dragline excavator 1 having a rotatable cab 2 mounted upon a crawler frame 3. A tiltable boom 4 extends forwardly at an incline from the front of the cab 2, and also extending from the front of the cab 2 is a tiltable mast 5 that extends above the lower end portion of the boom 4. Secured to the base of the cab 2 and rising upwardly above the roof of the cab 2 is a gantry 6. The gantry 6 has a right side tension member 7 and a right side compression member 8 that are joined at their upper ends by a gusset plate 9. The gantry 6 also comprises left side tension and compression members similar to the members 7 and 8, which are not shown.

Extending between the top of the gantry 6 and the upper extremity of the mast 5 is a boom hoist line 10. The line 10 comprises several runs between the gantry 6 and mast 5 and one end passes downwardly to a boom hoist drum within the cab 2, that is not shown. By drawing in or paying out the line 10 the boom 4 may be raised or lowered. A stay line 11 of fixed length runs from the upper extremity of the mast 5 to the upper end of the boom 4. Additional stay lines 12 and 13 are strung between the upper end of the mast 5 and points along the boom 4, as shown, to provide necessary support for the boom 4 and connections with the mast 5, so that movements of the mast 5 cause the boom 4 to tilt accordingly.

A hoist cable sheave 14 is rotatably mounted at the upper end of the mast 5 and a similar hoist cable sheave 15 is rotatably mounted at the upper end of the boom 4. Mounted within the cab 2 is a hoist cable spool assembly 16 and running upwardly from the assembly 16 is a hoist cable 17 that passes about the sheave 14 and continues upwardly and forwardly to the sheave 15. The hoist cable 17 then passes about the sheave 15 and drops downwardly therefrom for attachment at its free end 18 with a bail chain 19 of a dragline bucket 20.

A twin sheave fairlead 21 is mounted at the front of the cab 2 through which is led a dragline cable 22. The cable 22 is dead ended upon a dragline cable spool assembly 23 mounted within the cab 2 to the front of the hoist cable spool assembly 16 and runs outwardly from the twin sheave fairlead 21 to a connection with a dragline chain 24. The cable 22 is also connected with the bail chain 19 and an integral bail 25 at the open end of the dragline bucket 20.

The spool assemblies 23 and 16 are viewed in Figs. 2 and 3, respectively, from the ends at which holding brakes, to be described and forming a part thereof, are located. Referring first to Fig. 2, there is shown a left side end view of the dragline cable spool assembly 23 taken on a section through a rotatable drive shaft 26. Driving means for the shaft 26 is not shown, and may be of known form. The shaft 26 mounts a cable spool 27 upon which is wound the dragline cable 22. The spool 27 may be caused to rotate in either direction by control means, also not shown, and secured to the cable spool 27 is an axially extending brake drum 28 of a brake generally designated by the numeral 110. A shroud plate 29 bolted to a hub 30 on the shaft 26 encloses the interior of the drum 28.

Surrounding the brake drum 28 is a flexible brake band 31 formed in two sections joined together as shown at 33. A plurality of brake lining segments 32 are secured to the band 31 in facing relation to the drum 28. As shown in Fig. 2, the brake lining segments 32 may be brought up tightly against the outer circumferential face of the drum 28 to effect a braking action to restrain rotation of the spool 27.

One end of the flexible brake band 31 is secured to a link 34 that is attached through a pivotal connection with a supporting frame 35 rising from a deck plate 112 of the cab 2. The link 34 restrains the associated end of the brake band 31, from moving circumferentially, but through its pivoted connection with the frame 35 permits the end of the band 31 to be moved radially inwardly against the brake drum 28 and radially outwardly to be freed of frictional engagement with the drum 28. The opposite end of the brake band 31 is secured to a link 36 which is pivotally supported on a bell crank 37. The bell crank 37 is pivotally mounted upon an ear 38 extending upwardly from the supporting frame 35. A long lever arm 39 forming a part of the crank 37 is pinned at its extreme end to a piston shaft 40 extending from a pneumatic brake setting and releasing cylinder 41. The cylinder 41 is provided with a flexible air inlet hose 42 and is mounted upon a plate 43 attached to and forming a part of a bracket 44 that may be swung about a pivotal connection with the ear 38. A small ear 45 on the underside of the plate 43 connects with a bolt 46 that passes through a plate 47 extending from the supporting frame 35. The bolt 46 is fixed in relation to the plate 47 by a set of lock nuts 48, and thus through adjustment of the bolt 46 the brake setting and releasing cylinder 41 may be disposed in a particular position desired.

A curved channel member 49 is uniformly spaced radially outwardly from that portion of the brake band 31 above the brake drum 28. The left hand end of the channel member 49, as viewed in Fig. 2, is bolted to a bracket 50 rising upwardly from the supporting frame 35, and the right hand end of the channel member 49 is secured to a vertical member 51 that in turn is supported upon a main frame member 52, a portion only of which is shown. Disposed on the radially inner face of the curved channel member 49 is a group of three brake band release support assemblies 53, one of which is clearly shown in Fig. 4.

An assembly 53 comprises a mounting bracket 54 welded to the channel member 49, to which are secured a pneumatic release support cylinder 55 and an adjustable pivot support bolt 56. The bolt 56 is bifurcated at one end that mounts a pivot pin 57, upon which is borne a link 58 that rides between the bifurcations of the bolt 56. The penumatic release support cylinder 55 has an air inlet hose 59 and extending from the underside of the cylinder 55 is a piston stem 60 disposed in a position to bear against one end of the link 58. The opposite end of the link 58 is pivotally joined to a connecting link 61 which in turn is pinned to an ear 62 attached to the back face of the brake band 31. A pivot of the link 58 in response to an outward thrust of the piston stem 60 will move the connecting link 61 away from the brake drum 28 to raise the brake band 31 from the face of the brake drum 28. A retraction of the piston stem 60, or a venting of the cylinder 55 to permit such retraction without restraint, allows the link 58 to pivot freely to permit the brake band 31 to be displaced radially inwardly against the face of the brake drum 28. To provide an adjustment for the position of the pivot pin 57, for positioning the brake band 31 with respect to the brake drum 28 upon an operation of the piston stem 60, the bolt 56 is secured to the mounting bracket 54 through the employment of a set of lock nuts 63.

Referring again to Fig. 2, on the underside of the brake band 31 there is positioned a roller 63 that is spaced from the band 31 when the brake 110 is set for braking action with the band 31 tightly against the drum 28. Upon a release of the brake 110 the roller 63 will support a lower portion of the band 31 that has been moved radially from the drum 28. To support the roller 63 a bracket 64 is bolted to a support 65 rising upwardly from the deck plate 112.

Referring now to Fig. 3, there is shown the hoist cable spool assembly 16 as viewed from the right side of the shovel 1. From this side of the assembly 16 there is shown the hoist cable spool brake 111, which is substantially the same as the brake 110, and which operates in like manner. A spool shaft 66 is in driving relation to a hoist cable spool 67 upon which is wound the hoist cable 17. Attached to the cable spool 67 is an axially extending brake drum 68. A flexible brake band 69, formed in two pieces and joined at 70, surrounds a major circumferential portion of the brake drum 68 and attached to the radially inner face of the band 69 is a plurality of brake lining sections 71.

Similarly, as in Fig. 2, one end of the brake band 69 is circumferentially fixed by attachment to a link 72 pivotally connected to a stationary bracket 73 welded to a principal supporting frame 74. The opposite end of the brake band 69 is fastened to a circumferentially movable link 75 pinned to a bell crank 76. The bell crank 76, in turn, is pivotally borne by an ear 77 fixed to the supporting frame 74. A long lever arm 78 forming a part of the bell crank 76 is pinned to a piston shaft 79 of a pneumatic brake setting and releasing cylinder 80. The cylinder 80 is mounted on a plate 81 forming part of a bracket 82 pivoted to the ear 77. This arrangement provides for shifting the cylinder 80 into desired position for purposes of adjustment. To retain the cylinder 80 in position an adjustment bolt 83 is pivotally attached at one end to an ear 84 on the plate 81 and is passed through an aperture in a stationary plate 86 to which it is fixed by a set of lock nuts 85.

The supporting frame 74 is mounted upon a deck plate 87 of the cab 2. A second supporting frame 88 on the opposite side of the drum 68 is bolted in place on a main frame member 89, a portion only of which is shown. Supported by and bridging between the frames 74, 88 is a curved channel member 90, that is similar to the channel member 49 shown in Fig. 2. The channel member 90 is disposed radially outwardly from a major portion of the brake band 69 above the brake drum 68 to mount a plurality of brake band release support assemblies 53, that are identical to the support assemblies 53 shown in Figs. 2 and 4. The brake band release support assemblies 53, shown in Fig. 3, are each connected to the back face of the brake band 69 for a purpose of operation identical to that of the assemblies 53 in Fig. 2 that are connected to the brake band 31.

A roller 91 is shown in Fig. 3, which is similar to the roller 63 in Fig. 2. The roller 91 is supported by a bracket 92 that in turn is bolted to a support member 93 rising upwardly from the deck plate 87. As shown in Fig. 3, the roller 91 is supporting the bottom portion of the brake band 69, the brake band 69 being in brake released position. With the brake released, the brake lining segments 71 are uniformly spaced from the brake drum 68 to eliminate any frictional engagement with the drum 68 that might occur in the absence of the assemblies 53 and the roller 91.

Referring now to Fig. 5, there is shown schematically the pneumatic control system for the dragline cable spool brake 110 of Fig. 2. The three release support cylinders 55 of the brake band release support assemblies 53 are each connected through the respective air inlet hose 59 to an air duct 94. The duct 94 is connected to one outlet port 95 of a four way control valve 96. The valve 96 has a second outlet port 97 that joins with one end of a duct 98 that connects at its opposite end with the input side of a throttle valve 99. A duct 100 that branches from the duct 98 connects with the outlet side of a check valve 101. The inlet side of the check valve 101 is connected to a duct 102 that joins with a duct 103. Duct 103 connects at one end with the outlet of the throttle valve 99 and at the opposite end with the flexible hose 42 that feeds the brake releasing and setting cylinder 41. Each cylinder 55 houses a spring 108 that biases the associated piston stem 60 to a retracted position, and the cylinder 41 houses a bias spring 109 to urge the piston shaft 40 and the bell crank 37 to brake released position.

The four way control valve 96 is provided with an inlet port 104 connected to a pneumatic pressure supply duct 105, and also with an exhaust port 106 which leads to the atmosphere. For operation of the valve 96 an electromagnetic solenoid 107 is provided which may be controlled from the operator's station in the cab 2. A pneumatic control system similar to that of Fig. 5 is also provided for the hoist cable spool brake 111.

Digging operations with the dragline excavator 1 are accomplished in well known fashion through the manipulation of the hoist and dragline cables 17 and 22. The digging will be commenced by swinging the bucket 20 outwardly to the position shown in Fig. 1. To swing the bucket 20 to this position the dragline cable 22 will be drawn in on the spool 27, and the desired length of hoist cable 17 will be paid out to suspend the bucket 20 in pendulum-like fashion. The hoist cable spool 67 will now be held against rotation and the dragline cable 22 is then permitted to be paid out by allowing the spool 27 to run freely. The bucket 20 will swing toward the position shown and be brought to rest for commencing a digging stroke. The digging stroke is now made by drawing in the dragline cable 22 and paying out the hoist cable 17, as necessary, as the bucket 20 descends into the cut. Upon completing the digging stroke the dragline cable 22 may be reaved in an additional amount to raise the bail 25 and elevate the digging or open end of the bucket 20. Through artful control of the hoist and dragline cables 17, 22 the bucket 20 may be raised to an elevation, while being retained at an angle of tilt to keep the load within the bucket, to provide clearance for swinging the cab 2 to a position where the bucket 20 may be upended to dump the load.

In the manipulation of the bucket 20 the brakes 110, 111 are frequently brought into play, and both quickness of response and positiveness in moving between set and released positions are characteristics required for optimum operation. The loads handled require brake bands of considerable size, such that when moved to released position the weight of the bands alone is sufficient to collapse the bands downwardly to bear against the respective brake drums. The release and support assemblies 53 serve to render a rapid release of the brakes and to also support the bands upon release. The assemblies 53 further function in a manner to relinquish support for the bands upon operating the brakes to set position. These characteristics of operation are of particular usefulness in manipulating a dragline bucket.

To set either brake 110, or 111, the associated operating solenoid is deenergized. In the instance of the dragline cable spool brake 110 deenergization of the solenoid 107 connects the outlet port 97 of the control valve 96 with the inlet port 104 to introduce air under pressure from the duct 105 to the duct 98. The control valve 96 simultaneously connects the outlet port 95 with the exhaust port 106. The duct 94 and each of the release support cylinders 55 are then exhausted to the atmosphere. Air under pressure will pass through the duct 98 and hence through the throttle valve 99 and the duct 103 to within the brake setting and releasing cylinder 41. The check valve 101 will block the flow of air and the throttle valve 99 is adjusted to cause a build up of pressure to occur within the cylinder 41 without objectionable inrush pressures, that might cause either an undue shock in the apparatus to be braked or an unwanted reciprocation of the piston shaft 40 due to rebound.

Piston shaft 40 is moved outwardly from the cylinder 41 to pivot the bell crank 37 to move the link 36 circumferentially toward the link 34. The brake band 31, and the brake lining segments 32, are wrapped tightly about the brake drum 28 to retard rotation of the spool 27.

As pressure builds up within the cylinder 41 the interiors of the release support cylinders 55 of the brake 110 are brought to atmospheric pressure by venting of the duct 94 through the control valve 96. With atmospheric pressure prevailing in the cylinders 55 the springs 108 retract the piston stems 60 and the links 58 are free to pivot without restraint. Thus, there will not be opposition to movement of the brake band 31 radially inwardly to brake setting position.

To release the brake band 31 from braking engagement with the drum 28 the solenoid 107 is energized to shift the four way control valve 96. The valve 96 will now connect the outlet port 97 to the exhaust port 106 to vent the brake setting and releasing cylinder 41. The check valve 101 freely permits flow of air from the cylinder 41 to the atmosphere, and the spring 109 is of size to rapidly retract the piston shaft 40 and shift the link 36 circumferentially to effect an increase in diameter of the band 31.

The valve 96 also connects the release support cylinders 55 to the inlet port 104 to introduce pressure within the cylinders 55 for urging the piston stems 60 outward against the links 58. Each link 58 is thus pivoted about its respective pin 57 to move the associated connecting link 61 radially outwardly. The brake band 31 will consequently be moved away from brake set position into brake released position and since the links 61 are pivotally mounted the band 31 is free to move circumferentially to accommodate for increased band diameter. In released position the brake lining segments 32 in the vicinities of the assemblies 53 will be spaced and supported from the drum 28 by the action of the cylinders 55.

Since the brake band 31 and brake lining segments 32 may be of considerable size and weight, the lower portions of the band 31 slung beneath the drum 28 and connecting with the link 34 will tend to fall away from the brake drum 28 upon a release of the brake. The back face of the band 31 will then bear upon the roller 63, for the support that is necessary, and the brake lining segments 32 will be uniformly spaced from the drum 28 for the full extent of the band 31. The spool 27 may rotate in response to drive mechanism attached to the shaft 26 without interference of the brake 110.

In Fig. 3, the brake 111 is shown in brake released position and assumes a spaced relation for the brake lining segments 71 as has been described with reference to the brake 110. The operation of the brake 111 is like that described in connection with the brake mechanism of Fig. 2.

There is thus provided a set of brake 110, 111 adapted to be employed directly upon the cable spools of an excavator that exhibit the necessary characteristic of quick positive response in being shifted between set and released positions. This characteristic is incorporated in brakes having band sizes for handling large loads, and in which there is no danger of the bands collapsing against the brake drums when in released position.

I claim:

1. In a friction brake the combination comprising a brake drum; a brake band in facing relation to said drum with an end relatively shiftable circumferentially with respect to said drum to wrap the band tightly about the drum for effecting a braking action and to release the band to permit the same to be spaced from the drum; a brake actuator engaged with said brake band to wrap the band about the drum for effecting said braking action and to release the band; and a fluid pressure operated band supporting operator having positions of rest and operation cooperatively engaged with said brake band to move a portion of said band away from said drum when operated for spacing the band and drum from one another when said band is released, and when in position of rest permitting said band to be moved into tightly wrapped position with respect to said drum.

2. In a friction brake the combination comprising a brake drum; a brake band in facing relation to said drum with an end relatively shiftable circumferentially with respect to said drum to wrap the band tightly about the drum for effecting a braking action and to release the band to permit the same to be spaced from the drum; a fluid pressure operated band supporting operator having positions of rest and operation cooperatively engaged with said brake band to move a portion of said band away from said drum when operated for spacing the band and drum from one another when said band is released, and when in position of rest permitting said band to be moved into tightly wrapped position with respect to said drum; a brake actuator attached to an end of said brake band to shift said band end circumferentially in one direction for braking action and in the other direction for release of said band; and operating means for said band supporting operator and said brake actuator for alternatively operating said operator and actuator whereby said actuator retains said band end shifted for braking action when said operator is at rest and said operator is in position of operation when said actuator retains said band end in brake releasing position.

3. In a friction brake the combination comprising a brake drum; a brake band in facing relation to said drum with an end relatively shiftable circumferentially with respect to said drum to wrap the band tightly about the drum for effecting a braking action and to release the band to permit the same to be spaced from the drum; a fluid pressure operated band supporting operator having positions of rest and operation cooperatively engaged with said brake band to move a portion of said band away from said drum when operated for spacing the band and drum from one another when said band is released, and when in position of rest permitting said band to be moved into tightly wrapped position with respect to said drum; and a fluid pressure operated brake actuator having positions of rest and actuation attached to an end of said brake band to shift said band end when actuated by fluid pressure circumferentially in one direction for braking action and when restored to position of rest in the other direction for release of said band.

4. A brake as set forth in claim 3 with a control valve having an inlet, exhaust and a pair of outlets, fluid duct connections between the first valve outlet and said band supporting operator, second fluid duct connections between the second valve outlet and said brake actuator; and controlling means for said valve alternatively placing said valve in a position joining the first outlet to the exhaust and the second valve outlet to the inlet and another position joining the second valve outlet to the exhaust and the first valve outlet to the inlet.

5. In a friction brake the combination comprising a brake drum; a brake band in facing relation to said drum adapted to be moved into a braking position against said drum and into a released position whereby the band may be spaced from said drum, actuating means engaged with an end of said band for moving said band between said braking and released positions, a link pivoted between its ends, a connection between one end of said link and said brake band joining the link to the band at a point intermediate the ends of the band, and a fluid pressure operator cooperatively engaged with the opposite end of said link to cause said link to pivot upon actuation and move a portion of said brake band through said connection away from said brake drum.

6. In a friction brake the combination comprising a brake drum, a brake band in facing relation to said drum adapted to be moved into a braking position against said drum and into a released position whereby the band may be spaced from said drum; actuating means for moving said band between said braking and released positions, a pivot support adjustable in position, a link pivotally mounted between its ends upon said support, a connection between one end of said link and said brake band; and a force exerting operator adapted to be alternatively placed in actuation and at rest cooperatively engaged with the opposite end of said link adapted to apply a working force when actuated to cause said link to pivot and move a portion of said brake band through said connection away from said brake drum and to diminish said working force when placed at rest.

7. In a friction brake the combination comprising a brake drum, a brake band in facing relation to said drum adapted to be moved into a braking position against said drum and into a released position whereby the band may be spaced from said drum, actuating means attached to an end of said band for moving said band into braking position, and a force exerting operator adapted to be alternatively placed in actuation and at rest cooperatively engaged with said band at a point intermediate the band ends adapted to apply a working force when actuated to said band to move a portion of the band away from said brake drum and to relieve said band of said working force when at rest.

8. In a friction brake the combination comprising a brake drum; a brake band in facing relation to said drum adapted to be moved into a braking position against said drum and into a released position whereby the band may be spaced from said drum; actuating means for moving said band between said braking and released positions; a link pivoted between its ends; a connection between one end of said link and said brake band; a fluid pressure operator adapted to be alternatively placed in actuation and at rest cooperatively engaged with the opposite end of said link to apply a force upon actuation to said link to pivot the same and move a portion of said brake band through said connection away from said brake drum, and to relieve said link of said force when at rest; and control means for said actuating means and said operator to retain said operator in actuation when said actuating means has moved said band to released position and to retain said operator at rest when said actuating means has moved said band to braking position.

9. In a friction brake the combination comprising a brake drum; a brake band in facing relation to said drum; a first fluid pressure cylinder having a brake actuating piston cooperatively engaged with said band to alternatively place said band in brake set and released positions; a plurality of brake band supports each including a fluid pressure cylinder having a piston movable between positions of actuation and rest and cooperatively engaging said band to hold the same from said drum when in actuated position and to permit said band to be placed in brake set position when in the position of rest; control valve means having a vent, an inlet, and a pair of outlets that may be alternatively connected to said vent and inlet, whereby upon connection of one outlet to said inlet the other outlet is connected to said vent; and fluid connections joining said first fluid pressure cylinder to one of said outlets and joining said brake band support cylinders to the other of said outlets, the control valve means in one position applying fluid pressure to said first cylinder for setting the brake and venting said support cylinders, and in another position applying fluid pressure to said support cylinders to place the piston thereof in actuated position and venting said cylinder.

10. In a friction brake the combination comprising a brake drum, a band circumferentially extending about a portion of said drum adapted to be brought against said drum to effect braking action and to be moved from said drum for brake release, a brake actuator for said band to move the band against said drum for said braking action, a force exerting release support cooperatively engaged with said band having an actuated condition wherein a force is exerted upon said band capable to support a section of the same from said drum and a relaxed condition wherein said force is diminished, and control means for said brake placing said release support in actuated condition when said band is to be retained in position removed from said drum and placing said release support in relaxed condition when said band is brought against said drum by said brake actuator.

11. In a friction brake the combination comprising a brake drum, a band extending about a portion of said drum adapted to be brought against said drum to effect braking action and to be moved from said drum for brake release, a plurality of force exerting release supports spaced along said band and cooperatively engaged with said band at points intermediate the ends thereof each having an actuated condition wherein a force is exerted upon said band capable to support a section of the same from said drum and a relaxed condition wherein said force is diminished, and control means for said brake placing said release supports in actuated condition when said band is to be retained in position removed from said drum and placing said release supports in relaxed condition when said band is brought against said drum.

References Cited in the file of this patent
UNITED STATES PATENTS

| | | |
|---|---|---|
| 2,267,614 | Martinson | Dec. 23, 1941 |
| 2,270,431 | Freeman | Jan. 20, 1942 |
| 2,603,893 | Trask | July 22, 1952 |
| 2,633,649 | Page | Apr. 7, 1953 |